Aug. 17, 1965     D. O. PARKER     3,200,516
ELECTRONIC TEACHING DEVICE
Filed April 21, 1961     6 Sheets-Sheet 1

INVENTOR.
DONALD O. PARKER
BY
ATTORNEYS

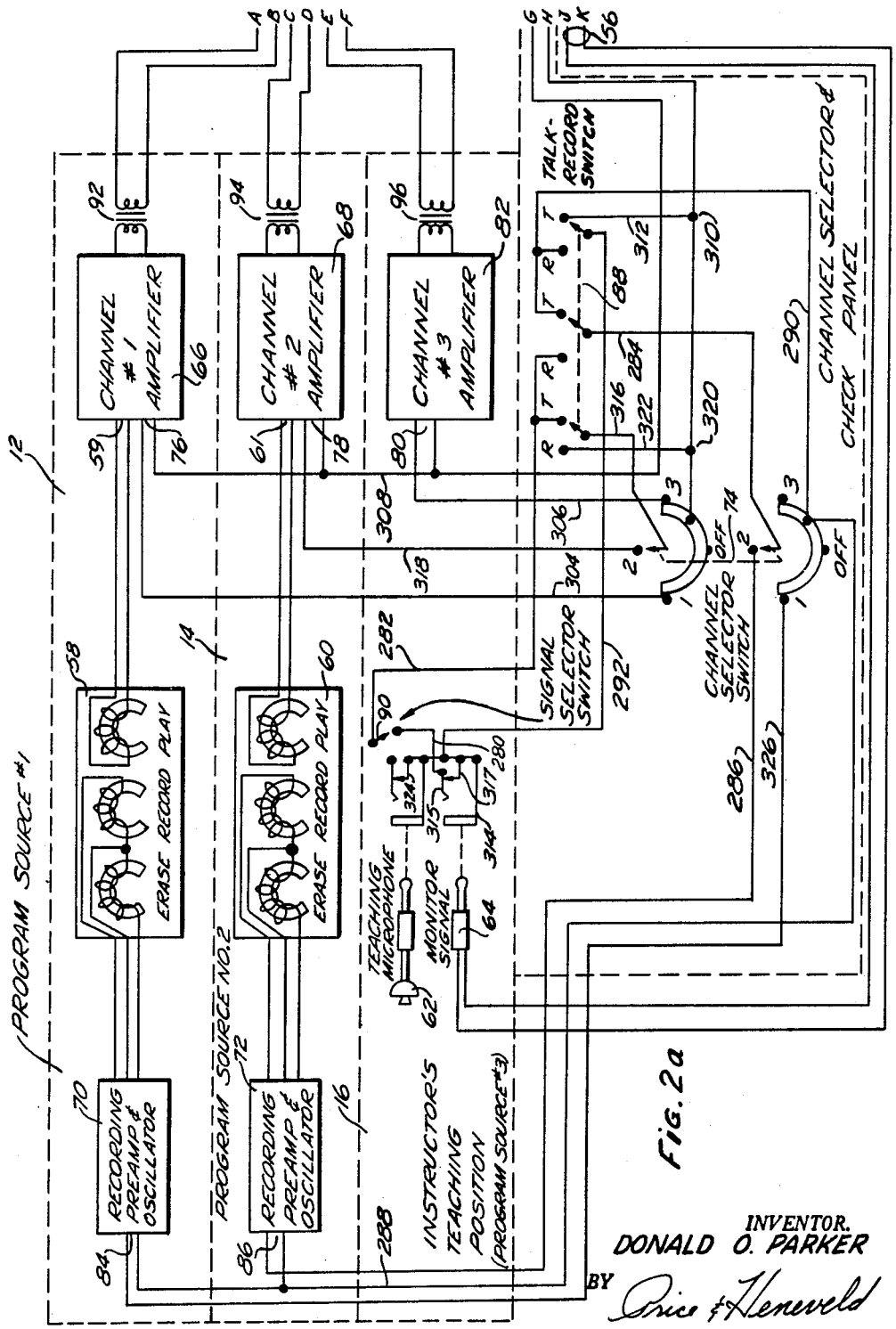

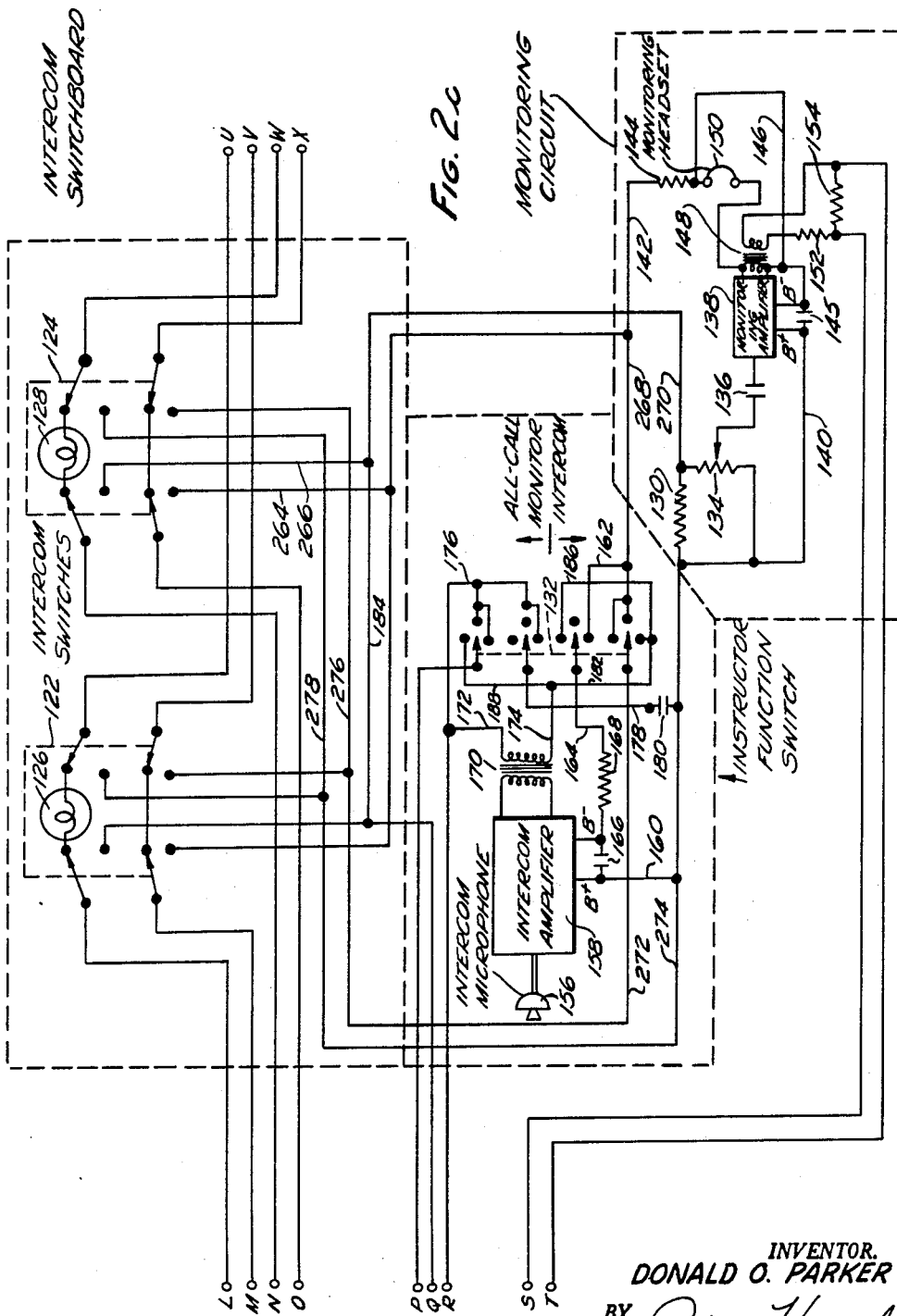

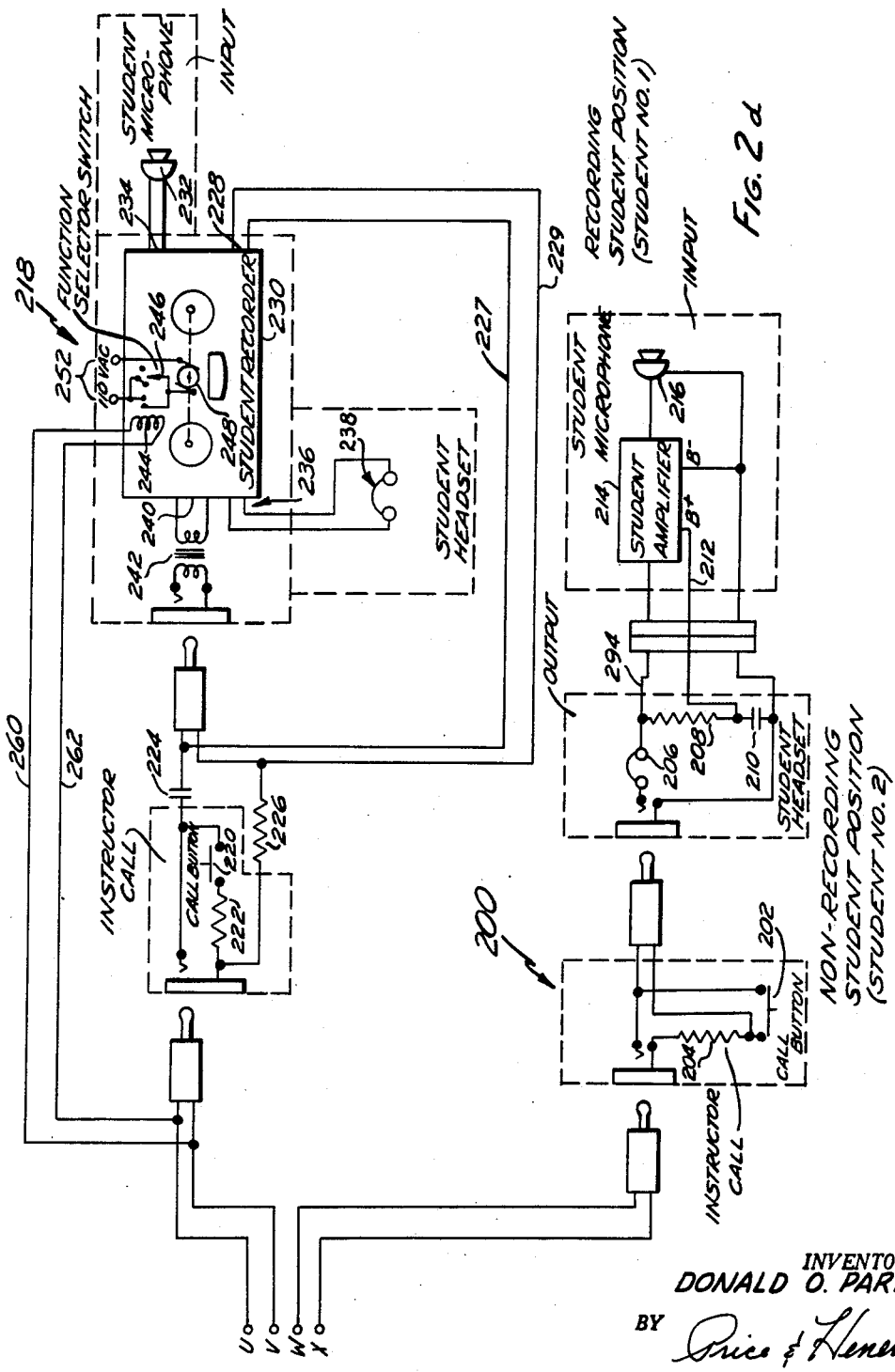

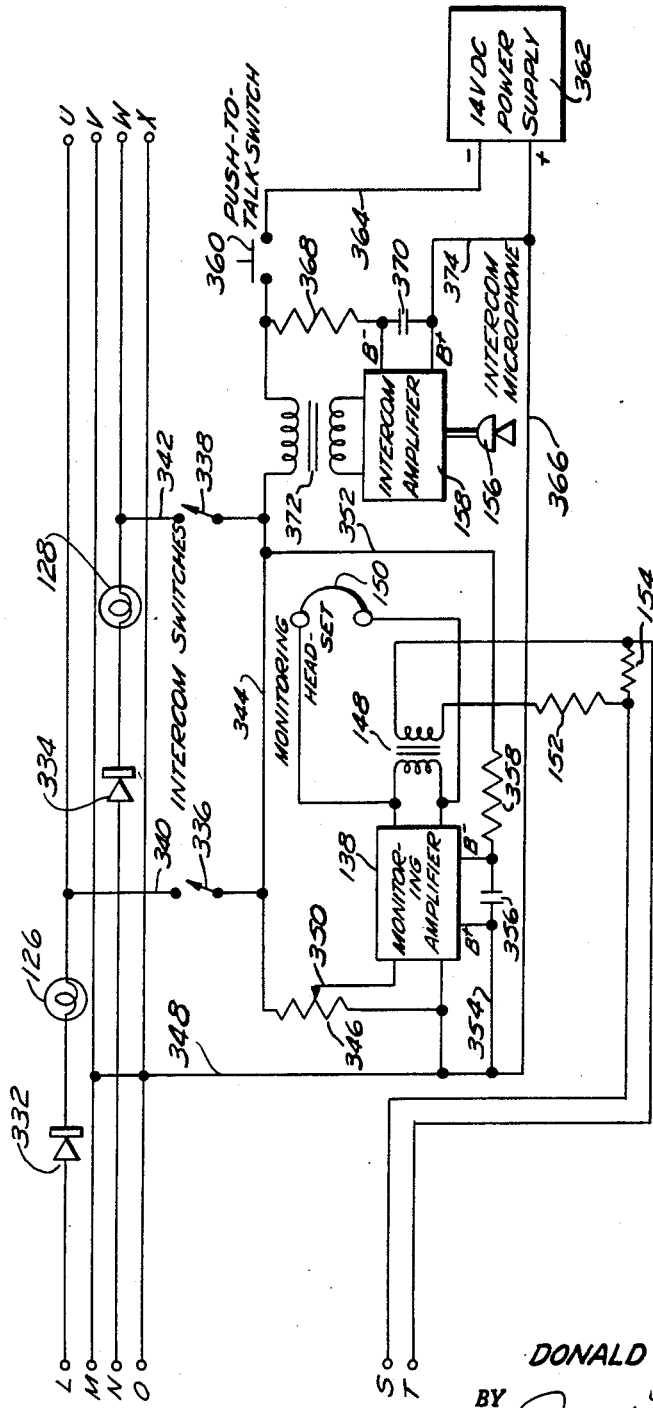

3,200,516
ELECTRONIC TEACHING DEVICE
Donald O. Parker, Grand Rapids, Mich., assignor to Fleetwood Furniture Company, Zeeland, Mich., a corporation of Michigan
Filed Apr. 21, 1961, Ser. No. 104,610
7 Claims. (Cl. 35—35)

This invention concerns teaching devices, and more particularly electronic teaching apparatus such as may be used, for example, for the teaching of languages.

In recent years, numerous language teaching systems have been developed. All of these systems work on the basic principle of providing soundproof booths or student positions for the students, transmitting an instructional program to the student, and giving the student an opportunity to imitate the words he hears in the instructional program. In some of the more elaborate installations, the student is provided with a tape recorder equipped to use a magnetic tape on which one channel carries an instructional program, and the other channel records both the instructional material from the first channel and also the student's response thereto. In all the prior art installations, however, it has been necessary to run a large number of wires from the instructor's control console to each student position, as separate wires had to be provided for power to remotely control the student's tape recorder, for power for the student's amplifier, and for any intercommunication signals between the student and the instructor. Furthermore, prior installations did not allow the instructor to monitor an individual student's efforts without the student being aware of the monitoring. This was undesirable because the awareness of being overheard tended to make a student self-conscious and therefore tended to interfere with his studying efforts.

The present invention solves these problems by providing programming, signalling, power, intercommunication and remote control of the students' tape recorders simultaneously over a single pair of wires between the control console and each student position. A special cable particularly well adapted for rapid wiring of a large number of student positions according to this invention is disclosed in the copending application Serial No. 22,019, now abandoned, filed April 13, 1960, of David G. Perry, entitled "Transmission System for Multiple Station System and Section for Use in Same" and assigned to the assignee of this application.

At the same time, the present invention permits monitoring of any student by the instructor, and even recording of an individual student's efforts at the control console without the student being aware that he is being overhead. The system of this invention also allows the student to call the instructor in case of difficulty by producing a visual signal at the instructor's intercom switch board; and the instructor in turn can communicate either with an individual student or with all students simultaneously by a single switching operation and without the use of any relays.

It is therefore the primary object of this invention to provide an instructional system on which program transmittal, intercommunication, power supply, remote control, and signalling functions can all be simultaneously carried on over the same pair of wires.

It is a further object of this invention to provide a teaching system wherein the instructor can monitor a student without the student being aware thereof.

It is another object of this invention to provide a teaching system in which the instructor can communicate either with a single student or with all students simultaneously by using a single switch without the intermediary of any relays or other remote-controlled switching devices.

These and other objects of this invention will become apparent from a perusal of the following specification, taken in connection with the accompanying drawings in which:

FIGS. 2a and 2b are wiring diagrams of one possible embodiment of control console;

FIG. 2c is a wiring diagram of one possible embodiment of intercom position;

FIG. 2d is a wiring diagram of two possible embodiments of student positions; and FIG. 3 is a wiring diagram of an alternative embodiment of intercom position.

FIGURES 2a through 2d are intended to be placed side by side from left to right; and FIGURE 3 may be substituted for FIGURE 2c in this juxtaposition to form a modification of this invention.

For the purposes of this specification and the claims appended thereto, the word "position" is used to designate a physically coherent group of electrical components which, in the inventive concept, may be installed remotely from other groups of components.

INTRODUCTION

Basically, the teaching device of this invention includes a control console or control position at which may be located a plurality of program sources such as tape recorders or disc recorders, and an instructor's teaching microphone. The control console also provides switching equipment by which any one or more of a plurality of student positions can be connected to any of the program sources. Within the scope of this invention, recording equipment may or may not be provided at the student positions. It is, however, contemplated that the student positions would normally be provided with microphones into which the student can speak in answer to the instructional material for practice purposes, as well as for the purpose of communicating with the instructor if and when such communication becomes necessary. For the latter purpose, the system is also provided with an intercom position at which the instructor or an assistant can monitor the efforts of the students, answer individual students' questions, or communicate with the entire class for such purposes as, for example, announcing the end of the class period.

A significant feature of this invention is that the principal power supply which provides power for the amplifiers at both the intercom position and the student positions is located in the control console. From the control console, the power is transmitted to the intercom position and the student positions through the same wires which carry the program signal and the intercom signals. In addition, these same two wires which are the sole connection between a student and the instructor, also carry the student's call signal and, when appropriate, the control current which synchronizes the students' recorders for the purpose of recording new instructional material.

In addition, the present system permits the instructor to monitor the efforts of any one student without introducing tell-tale clicks or signal attenuation on the line, and to likewise record a student's efforts at the control console so as to obtain a permanent record of the student's responses under the most natural conditions possible.

Finally, the present system allows the instructor to superimpose the instructor's voice onto all program channels regardless of how they are switched, without the use of relays and without introducing any crosstalk between the various program channels.

Figure 1:
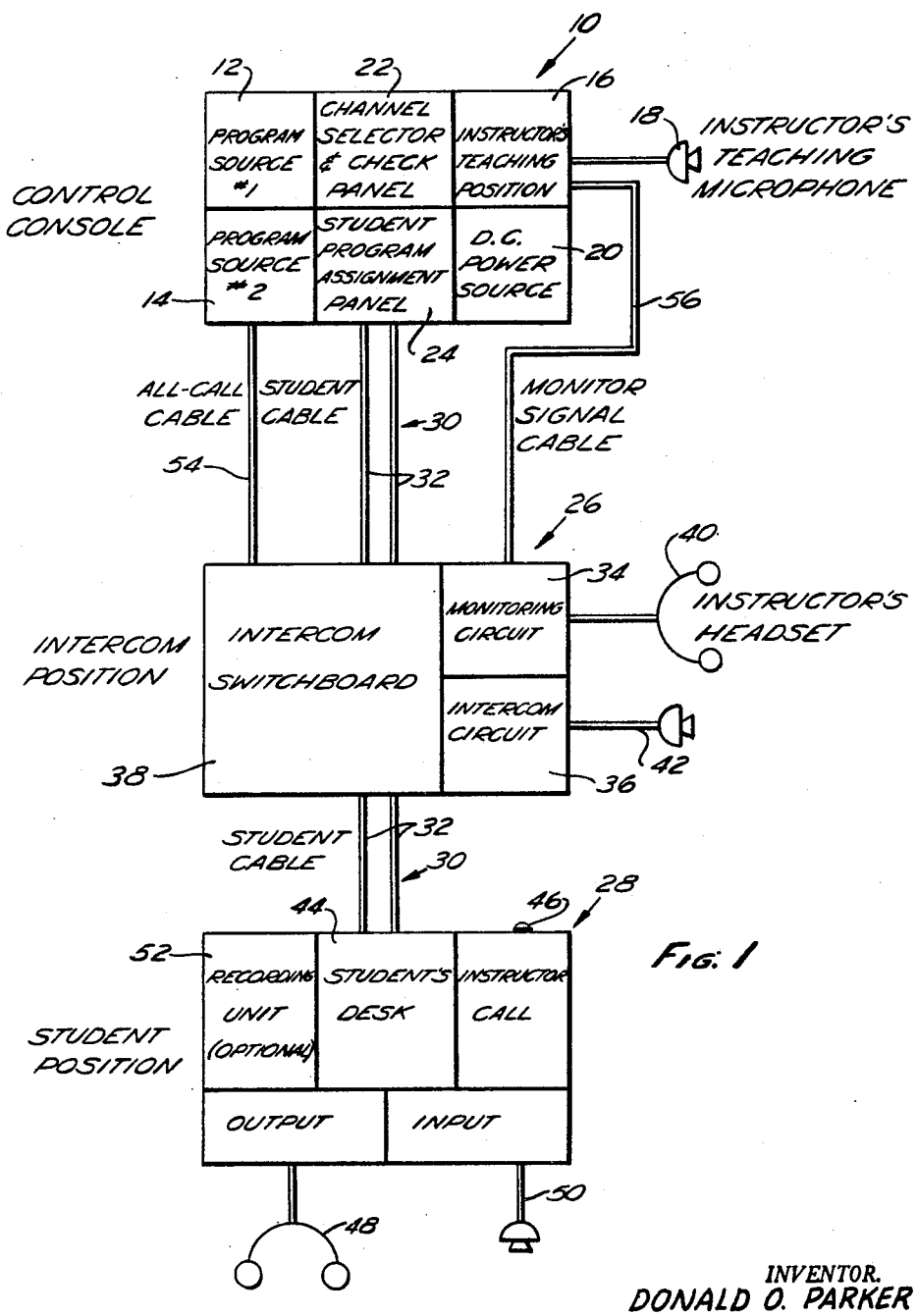
FIG. 1 is a schematic diagram showing the overall relationship of the control console, intercom position, and student position, and of the wiring required therebetween.

Referring now to the drawings, FIG. 1 shows a block diagram layout of a system constructed according to this invention. The control console or control position 10 may include a number of program sources, such as 12 and 14, which would normally be tape recorders or record players, or any combination thereof. A third program channel is derived from the instructor's teaching position 16 which is equipped with a teaching microphone 18. A D.C. power source 20 for powering the system's amplifiers is also provided in the control console and is connected to the signal-carrying lines in a manner hereinafter explained. A channel selector and check panel 22 permits the channeling of the signal from the instructor's teaching microphone into any desired one of the program channels. It also permits the routing of the student monitor signal into any desired one of the program source recorders such as 12; or, in the alternative, it enables the instructor to record new program material on one of the program sources while another program source is conveying instructional material to the students. Furthermore, it enables the instructor to check at the console 10 the proper operation of the program sources, and to test for the presence of audible ripple in the D.C. power supply. The student program assignment panel 24 permits the connection of any student position to any program channel.

The control console 10 is connected to the intercom position 26 and the student positions such as 28 by a student cable 30 including as many pairs 32 of wires as there are student positions. Each wire pair 32 can be individually interconnected with the monitoring circuit 34 and the intercom circuit 36 by pushing an appropriate button on the intercom switch board 38 for purposes hereinafter described. The instructor or assistant stationed at the intercom position 26 can monitor the wire pair 32 appurtenant to any of the student positions 28 through the headset 40, and can talk to any or all of the students through the microphone 42.

The student position 28 is normally equipped with a desk 44, a call button 46, a headset 48, a microphone 50, and, if desired, a recording unit 52.

A separate all-call cable 54 and a monitor signal cable 56 may also be provided between the intercom position 26 and the control console 10 for special purposes hereinafter discussed.

CIRCUITRY

CONTROL CONSOLE

Referring now to FIG. 2a, program source #1 is shown in more detail within the dotted-line enclosure 12. Likewise, program source #2 is shown in enclosure 14, and the instructor's teaching position or program source #3 is shown at 16. Program sources #1 and #2 have been shown, for convenience, as tape recorders 58 and 60. At the instructor's teaching position 16, a teaching microphone 62 or monitor signal 64 from the intercom position 26 can be used as program source #3. The output of tape recorders 58 and 60 are fed, respectively, to the tape inputs 59, 61 of the amplifiers 66 and 68. In both recorders, the play signal is kept separate from the erase bias and record signals which are furnished to the recorders 58, 60 by the preamplifiers 70, 72 respectively.

A channel selector switch 74 is provided to direct the signal from program source #3 into any desired one of the microphone inputs 76, 78, 80 of the amplifiers 66, 68, or 82 respectively, or to one of the microphone inputs 84, 86 of the recording preamps 70, 72, depending on the position of the talk-record switch 88. The channel selector switch 74 is so constructed that all amplifier microphone inputs not connected to program source #3 are connected together, and that likewise all preamp microphone inputs not connected to program source #3 are also connected together. The signal for program source #3 can be selected by the signal selector switch 90.

The signal outputs of amplifiers 66, 68 and 82 are fed through isolation transformers 92, 94 and 96 to the signal wire pairs A–B, C–D, and E–F. Following these wires into FIG. 2b, it will be seen that each of the aforementioned pairs is connected to one of the decoupling networks 98 in the D.C. power source 100. Each of the decoupling networks 98 consists of a capacitor such as 102 and a resistor such as 104. The capacitor 102 is of such capacitance as to interpose practically no impedance to any audio-frequency signal, yet present a practically infinite impedance to the direct current of the power supply 106. The resistor 104, on the other hand, is of such size that it opposes negligible resistance to the flow of direct current as compared to the D.C. input resistance of the amplifiers used in the system, yet opposes a large resistance to the flow of audio-frequency current in comparison with the audio-frequency impedance of capacitor 102. The purpose of the decoupling network 98 is to superimpose direct current power onto the signal current in each pair of wires, without however permitting crosstalk between the individual program channels.

A program source check headset 108 can be connected through a decoupling network 110, 112, whose resistor 112 also serves as a volume control, to any of the signal channels by the program source check switch 114. It will be noted that the lines A–B, C–D, and E–F all have one side connected to the negative side of the power supply 106 by a common wire 116, but that these three lines do not have any part of their signal paths in common, in order to avoid crosstalk. Following superposition of the D.C. power onto the signal, the program channel outputs are fed to program selector switches 118, 120, by means of which any of the student lines such as L–M and N–O can be connected to any desired one of the program channels #1, 2 or 3.

INTERCOM POSITION

Proceeding now to FIG. 2c, it will be seen that the student line L–M is connected to an intercom switch 122, and line N–O is connected to an intercom switch 124. In a preferred embodiment of the invention, the intercom switches 122, 124 may be in the form of push buttons containing lamps 126, 128 which serve as call indicators for the instructor. If one of the intercom switches 122, 124 is depressed, it will be seen that the line L–M is disconnected from the lamp 126 or 128 and is instead connected to resistor 130 which has the same resistance as the cold resistance of the filament of lamp 126 or 128. With the instructor function switch 132 in the position shown in FIG. 2c, the circuit of line L–M is completed all the way back to the terminals U–V at the right hand end of FIG. 2c. Consequently, the pushing of button 122 has had no other effect than to replace the lamp 126 with the resistor 130.

Connected in parallel with the resistor 130 is a potentiometer 134 of considerably higher resistance value. If any signal current flows in the line L–M, this signal current will produce a small voltage drop across the potentiometer 134. This voltage drop is picked off by the slider of potentiometer 134 and is fed through a D.C. blocking capacitor 136 to the signal input of monitoring amplifier 138. The D.C. power for amplifier 138 is supplied from line L–M through resistor 130 and wire 140 on the one hand, and through wire 142, resistor 144, and wire 146 on the other hand. A decoupling capacitor 145 is provided to bypass signal current around the bias terminal of amplifier 138. The audio output from amplifier 138 is fed to the primary of an output transformer 148 which has a headset 150 connected in parallel therewith. From the secondary of output transformer 148, the signal produced by amplifier 138 is fed through a voltage divider or attenuator consisting of resistors 152 and 154 into the monitor signal line leading to terminals S–T. The other end of this line appears in FIG. 2a and is shown therein at 64.

For intercommunication purposes, a microphone 156 is connected to an intercom amplifier 158. In the lower or "intercom" position of the instructor function switch 132, D.C. power is supplied to the amplifier 158 through resistor 130 and wire 160 from wire L and through wires 162, 164 from wire M. A decoupling network consisting of capacitor 166 and resistor 168 is provided to eliminate signal current from the power supplied to amplifier 158. The signal output from amplifier 158 is fed through output transformer 170 into wires 172 and 174. In the "intercom" position of switch 132, the signal appearing across wires 172, 174 is fed to the student line wire U through wires 176 and 178, and D.C. blocking capacitor 180; and to student line wire V through wire 182.

In the upper or "all-call" position of the instructor function switch 132, the intercom amplifier 158 receives its D.C. power not from line L–M, but from wires Q and R of the all-call cable P–Q–R. The positive D.C. supply comes from the control console through wire Q and reaches the amplifier 158 through wires 184 and 270, resistor 130, and wire 160. The negative D.C. supply in this case arrives through wire R and travels through wire 172, the secondary coil of output transformer 170, wires 174, 182, 186, and 164, and decoupling resistor 168 to the negative bias terminal of amplifier 158. In this case, the audio signal put out by amplifier 158 is connected to wire R through wire 172 and to wire P through wires 174 and 188.

Figure 2B:
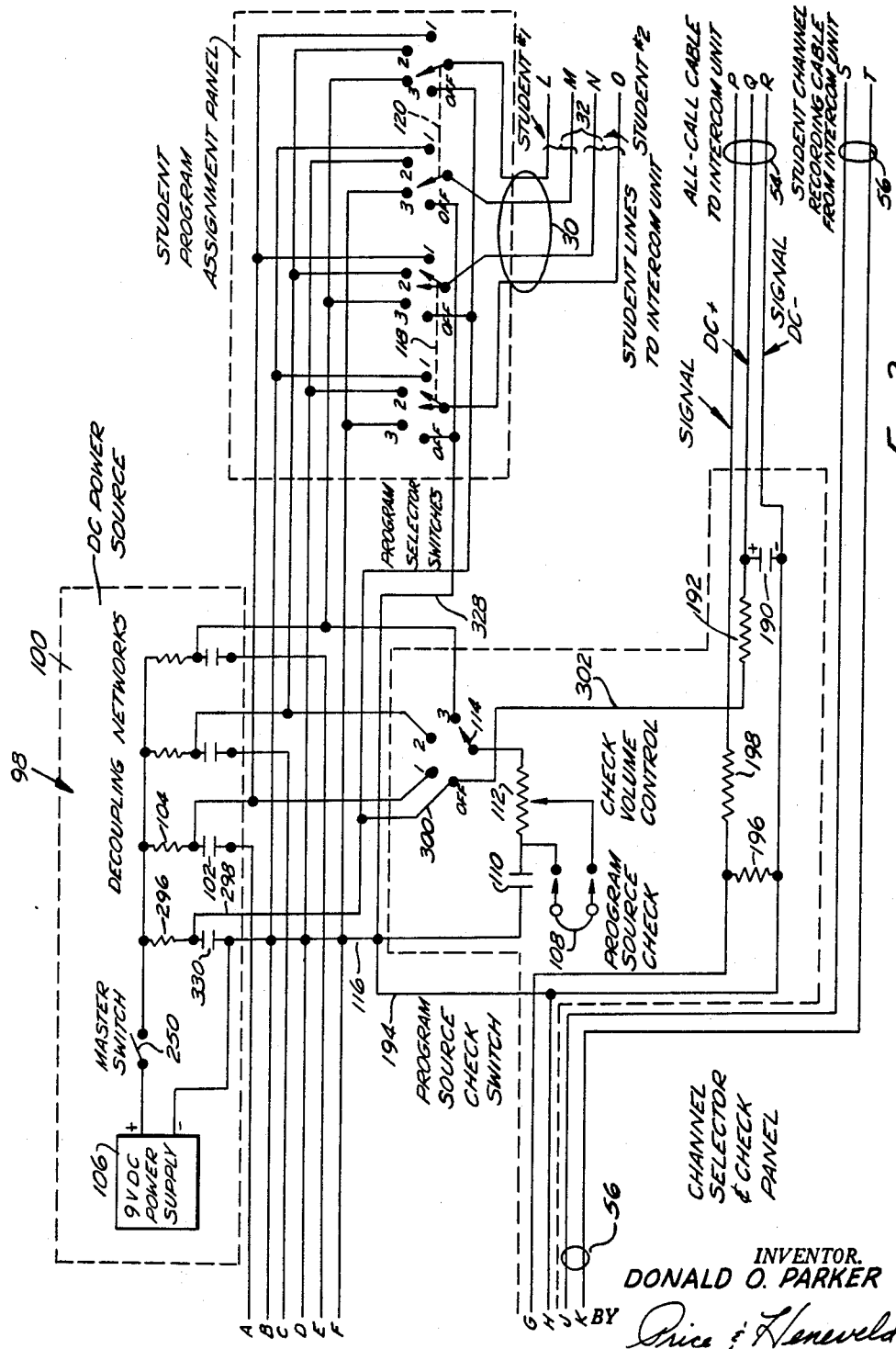

Tracing the all-call cable P–Q–R back to FIG. 2b, it will be seen that the D.C. supply wires Q–R are bridged by a ripple filter 190 which eliminates from the D.C. power in wires Q–R any remaining A.C. ripple which might induce a hum in the output transformer 170 or in the common wire R. Because of the presence of the filter 190, signal wire P has to be kept separate from D.C. wire Q to avoid short-circuiting the signal path. Wire Q is connected to the center of the leftmost one of the decoupling networks 98 through an additional decoupling resistor 192. Wire R is connected to the negative side of the power supply 106 through wires 194 and 116. The signal from the intercom amplifier 158 appearing across wires P–R is attenuated by a voltage divider network consisting of resistors 196 and 198 and is then fed to the microphone inputs 76, 78, 80 of all the program channel amplifiers through the all-call line G–H.

It will be seen that three wires rather than two are necessary in the all-call cable only because of the sensitivity of the all-call input to ripple pickup. If a battery were used for the D.C. power supply, for example, the ripple filter and hence the separation of wires P and Q would become unnecessary.

STUDENT POSITIONS

In FIG. 2d, two alternative types of student position are shown. Considering first the non-recording student position 200, it will be seen that the program and intercom signals, as well as D.C. power, are brought in through the student line W–X. If the student desires to communicate with the instructor, he depresses the call button 202. This short-circuits the line W–X through a low-resistance current limiting resistor 204 and causes the lamp 128 in FIG. 2c to light. Normally, however, the incoming signal and power travels through headset 206 in which the program and intercom signals are heard by the student. The signal current circuit is closed from the headset 206 through load resistor 208 and D.C. blocking capacitor 210 back to wire X. The D.C. power current flows through the bias resistor 208, but is then diverted into wire 212 which leads to the positive bias terminal of the student amplifier 214 whose negative bias terminal is connected directly to line X. The signal input to the student amplifier 214 comes from the microphone 216, whereas the signal output of the amplifier 214 appears across the load resistor 208, from which it is fed back into wire W through the headset 206, and into wire X through the D.C. blocking capacitor 210.

A recording student position is shown in FIG. 2d at 218. The incoming signals and power are delivered to the position 218 over the line U–V. As in the student position 200, a call button 220 is provided to short-circuit line U–V through a current limiting resistor 222. Because the limiting resistor 222 is connected across the line U–V rather than in series with it, call button 220 cannot completely short out the signal, so that the student at positon 218 can hear the program and the instructor's answer even while button 220 is depressed, though at greatly reduced volume. Normally, however, the incoming signal is impressed through D.C. blocking capacitor 224 and load resistor 226 onto the program signal input 228 of the student recorder 230 by means of wires 227 and 229. The student's microphone 232 is connected to the microphone input 234 of the student recorder 230. The output 236 of the student recorder 230 is directly connected to the headset 238, whereas the output 240 of the student recorder 230 is connected to the primary winding of output transformer 242, whose secondary winding is connected back to the student line U–V through capacitor 224 and resistor 226. The D.C. component of the current in the studert line U–V is directly connected to the coil of a relay 244. The normally open contacts of relay 244 can be bridged by the function selector switch 246 of the student recorder 230. When the function selector switch 246 is in the "program record" or rightmost position in FIG. 2d, the power supply to the motor 248 of the recorder 230 is interrupted unless there is D.C. power in the line U–V. Consequently, all recorders 230 whose function selector switches are in the "master record" position cannot start until the master switch 250 (FIG. 2b) is closed. This permits the presetting of all recorders on which a new master track is to be recorded, and their simultaneous starting by the actuation of a single control on the control console. It should be noted that the student recorder 230 is usually provided with its own power source 252 because of the large amount of power required to operate its motor. If, however, it is desired to operate all or part of the recorder 230 from the D.C. power in the line U–V, the recorder power input can be simply connected in place of or in parallel with the coil of relay 244, in series with an appropriate decoupling resistor.

ASSEMBLY

The control console shown in FIGS. 2a and 2b is normally housed in a single cabinet, and is permanently wired as shown in FIGS. 2a and 2b. If the intercom position of FIG. 2c is located remotely from the control console (which it need not be), it is connected to the control console by the student cable 30 containing as many lines 32 as there are student positions. In addition, if the all-call feature is desired, the all-call cable 54 is connected between the intercom position and the control console, and if it is further desired to record a student's efforts, the monitor signal cable 56 is also connected between the intercom position and the control console. In any event, each student position is connected to the intercom position by one of the student lines such as U–V or W–X.

OPERATION

*Example I*

PROGRAMMING

Assuming, for example, that it s desired, in a particular situation, to transmit a recorded program over channel #1 and to record the efforts of student #2 on program source #2, the operation of the device can be traced as follows: The program recorded on tape recorder 58 is fed to the input 59 of the channel #1 amplifier 66. The amplified signal passes through transformer 92 and line A-B to the decoupling network 98 associated with the line A-B. At the decoupling network 98, negative D.C. is supplied to wire B over wire 116. The signal in wire A travels through the blocking condenser 102 and picks up positive D.C. from the lower end of resistor 104. The resistance of resistor 104 is so chosen that it opposes sufficient resistance to the signal current to avoid any signal feedback into the power supply 106 which might result in crosstalk from one channel to another. From the decoupling network 98, the program signal and D.C. travel to the terminals marked "1" on the program selector switches 118 and 120. Since it has been assumed that both students are listening to the same program, both the switches 118 and 120 will be in the "1" position. The program signal and D.C. therefore travel simultaneously over line L-M and line N-O. It is of course possible to monitor or talk to more than one student at the same time by actuating more than one of the intercom switches 122, 124; but this would not normally be desirable. Since it has been assumed that student #2 is being monitored, push button 124 will be depressed and push button 122 will be in the released position shown in FIG. 2c. Consequently, the signal and D.C. on line L-M will travel through lamp 126 to line U-V. Assuming that the call button 220 at the student position 218 is released, the current flow in line L-M or U-V is not sufficient to light the lamp 126.

RECORDING STUDENT POSITION

At student position 218, blocking condenser 224 diverts the D.C. component of the current in line U-V through wires 260, 262 to the coil of relay 244. Of course, if call button 220 is depressed, D.C. will also travel through resistor 222 and call button 220 with sufficient amperage to light lamp 126. The program signal on line U-V goes through blocking capacitor 224 to input 228 of the student recorder 230, and is returned to line U-V through load resistor 226. The amplifier contained in the student recorder 230 amplifies the signals introduced at inputs 228 and 234, or those generated in the recorder's playback heads, and feeds them from output 236 to the student's headset and from output 240 to transformer 242. Positive feedback between output 242 and input 228 can be prevented by proper phasing of the circuit. The student microphone 232 is connected to record on the student recorder 230 his responses to the program material appearing in his headset, and to intercommunicate with the instructor.

MONITORING

The program signal and D.C. appearing on line N-O (FIG. 2c) is diverted in the depressed condition of push button 124 into wires 264, 266, and thence into wires 268, 270. Normally, the instructor function switch 132 will be in its central position as shown in FIG. 2c. In this condition, it will be seen that wire 268 is directly connected to wire 272, and wire 270 is connected to wire 274 through the resistor 130 which has the same resistance as the cold resistance of lamp 128. From wires 272, 274, the program signal and D.C. for student #2 are conveyed to line W-X through wires 276, 278 and the right-hand contacts of push button 124. It will be seen that in this condition, the impedance between line N-O and line W-X is the same whether or not the push button 124 is depressed (the resistance of potentiometer 134 is high enough so that the parallel combination of resistors 130 and 134 has a resistance value substantially equal to the resistance of resistor 130). For this reason, actuation of the push button 124 will not result in any tell-tale signal volume alternation in the student's headset.

RECORDING STUDENT'S EFFORTS

The voltage developed across potentiometer 134 is picked off by the slide of potentiometer 134, and its signal component is fed through the blocking capacitor 136 to the input of the monitoring amplifier 138. The signal is there amplified and is fed directly to the monitoring headset 150, and through transformer 148 and attenuating network 152, 154 to the monitor signal line S-T of cable 56 (FIG. 2b). Cable 56 can be traced directly through FIG. 2b without any side connections and becomes line J-K in FIG. 2a. Tracing line J-K in FIG. 2a, it will be seen that it terminates at the monitor signal jack 64. If the signal selector switch 90 is in the position shown in FIG. 2a and the talk-record switch 88 is in the "R" position, the signal from jack 64 will travel through wire 280, switch 90, wire 282, the center gang of switch 88, wire 284, the lower gang of channel selector switch 74, and wire 286 to input 86 of the recording preamp 72. The return path of the monitor signal can be traced from the recording preamp 72 through wires 288 and 290, the right-hand gang of switch 88, and wire 292 back to the jack 64.

Returning now to FIG. 2d, it will be seen that the signal and D.C. appearing on line W-X is fed to the student position 200, where the decoupling network 208, 210 leads the D.C. component to the bias terminals of the student amplifier 214, while the signal component travels through the student headset 206. The student's responses spoken into the microphone 216 are amplified in amplifier 214 and fed into line W-X through wires 212, 294. It will be seen that the signal appearing across potentiometer 134 contains both a program component and a student response component. Consequently, the monitor signal recorded on recorder 60 (FIG. 2a) will contain both the program and the student's responses thereto. If student #2 wishes to speak to the instructor and depresses the call button 202, the lamp 128 will not light because it is disconnected from the circuit; however, the volume in the monitoring headset will change so much that the instructor will readily be aware of the student's call.

INTERCOM

To communicate with student #2, the instructor can depress switch 132 to its lower or "intercom" position. In this condition, the output of transformer 170, which is the amplified signal picked up by the intercom microphone 156, is fed to wire 274 through wires 172, 176, 178, and blocking capacitor 180, and to wire 272 through wires 174 and 182. It should be noted that in this condition, the circuit between line N-O and line W-X is interrupted between wires 268 and 272, so that only an attenuated program signal flowing through decoupling capacitor 145 will appear across potentiometer 134. D.C. power for the intercom aplifier 158 is supplied in the "intercom" position of switch 132 from line N-O through wire 268, wire 162, wire 164, and decoupling resistor 168; and from wire 270 through resistor 130 and wires 274 and 160.

ALL-CALL

If the instructor at the intercom position now, for example, wishes to inform both students that the instruction period has come to an end, he raises switch 132 to its upper or "all-call" position and speaks into the microphone 156. In this position, the D.C. power supply for the intercom amplifier 158 can be traced as follows: from the positive side of the power supply 106 (FIG. 2b) through master switch 250, decoupling resistor 296, wires 298, 300, 302, decoupling resistor 192, wire Q, wires 184 and 270, resistor 130, and wires 274 and 160 to the positive bias terminal of intercom amplifier 158; and from the negative side of power supply 106 through wires 116, 194, R, and 172, the secondary coil of transformer 170, wires 174, 182, 186 and 164, and decoupling resistor 168 to the negative bias terminal of intercom amplifier 158. A high-capacity ripple filter 190 (FIG. 2b) connected across wires Q and R eliminates from the D.C. potential any residual A.C. ripple which, when fed through the secondary coil of transformer 170 and the common wire R, would introduce an objectionable hum into the signal output from the intercom amplifier 158.

The all-call signal output from intercom amplifier 158 is generated in the secondary coil of output transformer 170, and its path can be traced as follows: through wires 172, R, and H, the wiper of the upper gang of channel selector switch 74, and wires 304 and 306 to input 76 and 80 of channel amplifiers 66 and 82, respectively; and back through common wire 308 and wire G, voltage divider resistor 198, wires P, 188, and 174 to transformer 170. In the depicted position of the channel selector switch 74 (FIG. 2a), the all-call signal supply to channel #2 amplifier 68 can take place in either one of two ways: if the talk-record switch 88 is in the "T" position and jack 64 is plugged in, the signal arriving on wire H goes through junction 310, wire 312, wire 292, contact 314 of the monitor signal jack 64, wires J, S, voltage divider resistor 154 (FIG. 2c), wires T, K, contact 315 of jack 64, switch 90, wires 282, 316, and 318 to input 78 of amplifier 68; and then back to the common wire 308. Positive feedback through resistor 154 is avoided by proper phasing of transformer 148. If jack 64 is not plugged in, the signal jumps directly from wire 292 to contact 315 through normally closed contact 317. If the talk-record switch 88 is in the "R" position, the signal from wire H goes through junction 320, wires 322, 316, and 318 to input 78 of amplifier 68, and then back to common wire 308.

If the signal selector switch 90 is in its leftmost position, the all-call signal will go from wire 292 through either the normally closed contact 324 of the teaching microphone jack, or through the microphone 62, switch 90 and thence to wire 282. In any event, the instructor's voice on all-call is superimposed onto the programs on all three channels so that the lesson will not be interrupted by the instructor's announcement. If it is desired to give the class more prolonged instructions during which the continuance of the program would be undesirable, the instructor need merely stop the program sources before throwing the all-call switch.

*Example II*

If the instructor now desires to instruct student #2 "live" while feeding a pre-recorded program from program source #1 to student #1, he merely needs to plug in teaching microphone 62 (FIG. 2a) and make the following circuit changes from the set-up as described in Example 1: signal selector switch 90 to the left, talk-record switch to "T," and program selector switch 118 to "2." In this condition, the signal spoken into microphone 62 is conveyed over wires 282, 316, and 318 to input 78 of amplifier 68 and returned to microphone 62 over wires 308, G, resistor 196, and wires H, 312, and 292.

*Example III*

If the instructor desires to produce a new master track on student recorder 230 (FIG. 2d) and to simultaneously instruct student #2, he pre-sets the student recorder 230 at student position 218 to the beginning of the tape and turns the function selector switch 246 to its rightmost position after opening the master switch 250 (FIG. 2b). This prevents the student recorder 230 from starting because relay 244 is de-energized. When the instructor is ready to begin the recording, he closes the master switch 250, which causes energization of relay 244 and starts the student recorder 230. In the meanwhile, the instructor has switched program selector switch 120 to position "2," so that the voice of the instructor originating at microphone 62 will be carried over both student channels.

*Example IV*

If the instructor wishes to make a master recording on tape recorder 58 of program source #1, he turns the talk-record switch 88 to the "R" position and the channel selector switch 74 to the "1" position. In this condition, the signals from microphone 62 travel through wires 282, 284, and 326 to input 84 of the recording preamp 70. The return path of the signals is through common wire 288, wire 290, and 292 back to microphone 62.

*Example V*

If it is desired to have student #1 listen to a master track recorded on his own recorder 230 and to record his responses thereto, while student #2 listens to a pre-recorded program from program source #2, the program selector switch 118 remains in the "2" position, while the program selector switch 120 is switched to the "off" position. In the latter position, no signal is transmitted to student #1, but D.C. is still furnished to his line 32 through wires 298 and 328 respectively. Although under these conditions D.C. is not needed for relay 244 because its contacts are bridged out by the function selector switch 246, a D.C. supply to student position 218 is still necessary to operate lamp 126 when student #1 depresses call button 220. At the same time, the connection of wires 298 and 328 provides a closed signal circuit through blocking condenser 330 so that the master track signal and the student's voice signal injected into line U–V by transformer 242 (which it will be remembered, is connected in parallel with headset 238) can flow through potentiometer 134 when the instructor depresses button 122 in answer to the illumination of lamp 126. Simultaneously, the program signal from channel 2 is conveyed to student #2 over lines N–O and W–X in the manner hereinbefore described, with student #2 also having the opportunity of calling the instructor by depressing call button 202 to light lamp 128.

MODIFICATION

FIG. 3 shows a circuit which may be substituted for the circuit of FIG. 2c to provide a greatly simplified intercom system for installations in which no all-call feature is desired. In this embodiment, the signal lamps 126, 128 are permanently connected into the cricuits formed by the student lines L–M, U–V, and N–O, W–X respectively. However, diodes 332, 334 are now connected in series with the lamps 126, 128. Under normal conditions, the polarity of the D.C. current in the student lines is such that the diodes 332, 334 are biased in a forward direction so as to permit both the D.C. power and the A.C. signals to pass. By closing one of the switches 336, 338, the instructor can select either of the student lines for monitoring purposes. The monitored signal is picked off by wire 340 and 342 and is conveyed through wire 344 to a high-resistance potentiometer 346 from which it is returned to the selected student line over wire 348. The slider of potentiometer 346 serves as a volume control and conveys the monitored signal to the input of monitoring amplifier 138 through wire 350.

D.C. power is supplied to the monitoring amplifier 138 from the selected student line over wires 352 and 354, with a decoupling network 356, 358 being provided to avoid signal injection into the bias circuit of the monitoring amplifier 138. As was the case in FIG. 2c, the monitoring headset 150 is connected across the primary of output transformer 148 of monitoring amplifier 138, and the secondary of the output transformer 148 is connected through the attenuating network 152, 154 to the monitor signal line S–T. Also as in the embodiment of FIG. 2c, the monitoring of a student line is not perceptible by the student because the resistance of potentiometer 346 which bridges the student line being monitored is very high compared to the load impedance on the student end of the line.

If the instructor now desires to communicate with the student, he merely pushes the push-to-talk switch 360. This causes the 14-volt D.C. potential of power supply 362 to be impressed onto the selected student line through wires 364, 366. The polarity of the power supply 362 is so chosen that it counteracts the power supply 106 (FIG. 2b) as far as the diodes 332, 334 are concerned. The actuation of push-to-talk switch 360 therefore biases the diode of the selected student line in the reverse direction with a net reverse voltage of five volts, which is sufficient to render the diode non-conductive to both the D.C. component and the signal component of the current in the selected student line. At the same time, the power supply 362 substitutes itself for the power supply 106 as far as the student's amplifier (e.g. 214, FIG. 2d), and the monitoring amplifier 138 are concerned. These amplifiers are so designed in a well-known manner that their operation is unaffected by the increase in the D.C. power supply voltage. The lamps 126, 128 are not subjected to the increased D.C. voltage, however, because wires 340, 342 are each connected on the student side of the lamps 126, 128. Operation of the push-to-talk switch 360 also supplies power to the intercom amplifier 158 through decoupling network 368, 370. The intercom amplifier 158 amplifies signals picked up by the intercom microphone 156 and transmits them through transformer 372 to the selected student line.

It will be seen that if, for example, student line W–X has been selected by closing switch 338, one side of the secondary of transformer 372 is connected to wire W through wire 342, and the other side of the secondary of transformer 372 is connected to wire X through decoupling network 368, 370, and wires 374, 366, and 348. It will be readily seen that this modification of FIG. 3 requires considerably less elaborate switching equipment at the intercom position, which in turn permits a considerable reduction in the price of the apparatus, particularly if very many student positions are involved.

SUMMARY

It will be seen that the present invention provides an extraordinarily flexible, yet simple electronic teaching system which requires only a single pair of wires between the control console and each student position for teaching, intercommunicating, monitoring, recording, signalling, control, and power supply purposes.

The compatible-building-block concept of this invention permits, for example, the elimination of the entire intercom position by merely plugging the student cable U–V, W–X into the terminals L–M, N–O of the control console, as can be readily seen by placing FIG. 2d directly beside FIG. 2b. In such a case, the dotted-outline boxes marked "Instructor Call" in FIG. 2d can of course be dispensed with. Likewise, a student position designed for passive listening only can be readily made by disconnecting the box marked "input" in student position 200.

In addition, the invention makes it possible to contact all students simultaneously from a position which can be remote from the control console, by using only a single switch without the intermediary of any relays. Last but not least, the invention eliminates the effects of self-consciousness on the part of the student because his efforts can be monitored without him being aware of it. Obviously, numerous modifications of the circuitry described herein as a matter of illustration are possible without departing from the basic concept of this invention. Therefore, the embodiment described is intended as an example only, and the invention is not intended to be limited except by the scope of the following claims.

I claim:
1. An electronic teaching device comprising: a program source, a first power source, an intercom position, and a student position, a pair of wires connecting said program source and first power source to said student position, a diode connected in series with one of said wires in a direction where it is forwardly biased by said first power source, means for connecting a second power source of higher voltage than said first power source across said wires so as to reversely bias said diode, and means for injecting an intercom signal from said intercom position into said pair of wires on the student position side of said diode.

2. An electrically-operated teaching device comprising: a control position including a power supply and a source of instructional program signals; a student position remote from said control position; coupling means between the two said positions; means to audibly transduce said program signals upon receipt of the same at said student position; an electrical signaling component operably connected in said coupling means and having a predetermined impedance; a monitoring circuit having an element whose impedance closely approximates that of the above said component, and a second element having a high impedance relative to the first said element and being connected across the same, amplifying means connected across the second said element, and audio transducing means connected to the output of said amplifying means; and switch means whereby the first said element during the cutting in of said monitoring circuit to said coupling means is substituted for the said component without noticeably altering the transduced signal at said student position while providing to the said amplifying means an incremental signal voltage representative of intelligence passing between the two above said positions through the above said coupling means connecting the same.

3. An electrically-operated teaching device comprising: a control position including a power supply and a source of instructional program signals; a student position remote from said control position; coupling means between the two said positions; means to audibly transduce said program signals upon receipt of the same at said student position; indicating means located at said control position and being operable from said student position through the interconnections afforded by the above said coupling means; a monitoring circuit having an element whose impedance closely approximates that of the above said indicating means, a second element having a high impedance relative to the first said element and being connected across the same, amplifying means connected across the second said element, and audio transducing means connected to the output of said amplifying means; and switch means whereby the first said element during the cutting in of said monitoring circuit to said coupling means is substituted for the said indicating means without noticeably altering the transduced signal at said student position while providing to the said amplifying means an incremental signal voltage representative of intelligence passing between the two above said positions through the above said coupling means connecting the same.

4. An electrically-operated teaching device comprising: a control position including a power supply and a source of instructional program signals; a student position remote from said control position; coupling means between the two said positions; means to audibly transduce said program signals upon receipt of the same at said student position; a signal lamp located at said control position, said lamp being operable from said student position due to the interconnections afforded by the above said coupling means; a monitor circuit including a resistor whose resistance closely approximates the cold filament resistance of the above said signal lamp, a resistive element having a high resistance relative to the previous said resistor and connected across the same, an amplifier connected across the second said resistive element, and audio transducing means connected to the output of the said amplifier; and switch means located at said control position whereby the first above said resistor within the said monitor circuit may during operation of said teaching device be electrically substituted for the said signal lamp, thereby maintaining electrically identical conditions at the said student position while providing to the monitor amplifier an incremental signal voltage representative of intelligence passing between the two above said positions through the above said coupling means connecting the same.

5. An electrical teaching device, comprising: an instructor position including a source of power and a source of program signals; a student position remote from said instructor position; means at said student position for transducing said program signals; a single pair of wires interconnecting the two said positions in circuit, for simultaneously carrying both said power and said program signals therebetween; signalling means located at said instructor position connected into circuit with said pair of wires, said signalling means requiring a predetermined minimum amount of electrical energy to be actuated; impedance means in said circuit for normally maintaining the electrical energy therein at a level lower than said signalling means predetermined minimum; and means actuated at said student position to effectively remove at least some of said circuit impedance, thereby raising said circuit energy above said predetermined minimum and actuating said signalling means to indicate to one at said instructor position that a student at the student position is calling him.

6. An electrical teaching device, comprising: an instructor position including a source of power and a source of program signals; a student position remote from said instructor position; means at said student position for transducing said program signals; a single pair of wires interconnecting the two said positions in circuit, for simultaneously carrying both said power and said program signals therebetween; a signal lamp located at said instructor position connected into circuit with said pair of wires, said signal lamp requiring a predetermined minimum amount of current flow in said circuit and through it in order to become lighted; impedance means in said circuit for normally maintaining the level of current flow therein at a level lower than said signal lamp predetermined minimum; and means actuated at said student position to effectively remove at least some of said circuit impedance, thereby raising said circuit current above said predetermined minimum and lighting said signal lamp to indicate to one of said instructor position that a student at the student position is calling him.

7. An electrical teaching device, comprising: a control position including a plurality of program signal sources; a plurality of student positions, each including means for producing a student signal; and an intercom position including means for producing intercom and call signals; means for connecting said student positions to said program signal sources; said program signal sources each including an amplifier having input means; means including switching apparatus for feeding said call signals originating at said intercom position to said input means of each of said program source amplifiers simultaneously with and superimposed upon the program signals of at least one of said program signal sources; means for feeding an instruction signal from one of said program signal sources to said input means of only one of said program source amplifiers simultaneously with said call signal from said intercom position; means associated with said switching apparatus and said intercom position for selectively communicating with a predetermined number of said student positions while effectively blocking out the program signal source previously fed to such student positions; said input means of each of said program source amplifiers being so connected that the source of said call signals and the source of said instruction program signals are connected in series therewith and in parallel with each other, and said input means of each of the program source amplifiers being so connected that the source of said instruction signals are separately and independently connected to said program source amplifiers.

References Cited by the Examiner

UNITED STATES PATENTS

| 1,696,274 | 12/28 | Johnson | 179—170 |
| 1,919,719 | 7/33 | Harris et al. | 179—2 |
| 2,110,358 | 3/38 | Dreisbach | 179—1.1 |
| 2,157,841 | 5/39 | Adair | 179—2 |
| 2,397,881 | 4/46 | Nitterauer | 179—2 |
| 2,720,556 | 10/55 | Clark | 179—2 X |
| 2,800,646 | 7/57 | Lanham | 179—2 X |
| 2,830,127 | 4/58 | Ferguson et al. | 179—37 |
| 2,892,040 | 6/59 | Johnson et al. | 35—35.3 X |
| 2,978,538 | 4/61 | Breese | 178—6.8 |
| 3,069,789 | 12/62 | Knight et al. | 35—35.3 |

OTHER REFERENCES

"Teaching by Tape," published in the Washington Sunday Star, Aug. 23, 1959, page 68.

Publication, The R.C.A. Preceptor Language Laboratory, published April 1960, page 5.

Publication "Purchase Guide for Programs in Science, Math. and Foreign Languages," 1959, pages 263–287 (only p. 271 relied on).

CHARLES A. WILLMUTH, *Primary Examiner.*

LEO SMILOW, ABRAHAM BERLIN, JEROME SCHNALL, *Examiners.*